US012179626B2

(12) United States Patent
Chou et al.

(10) Patent No.: US 12,179,626 B2
(45) Date of Patent: Dec. 31, 2024

(54) STRUCTURE FOR HOLDING BATTERY PERMITTING RAPID REPLACEMENT AND AUTOMATED GUIDED VEHICLE USING STRUCTURE

(71) Applicants: Futaijing Precision Electronics (Yantai) Co., Ltd., Yantai (CN); HON HAI PRECISION INDUSTRY CO., LTD., New Taipei (TW)

(72) Inventors: Hun-Yi Chou, New Taipei (TW); Chih-Cheng Lee, New Taipei (TW); Yu-Sheng Chang, New Taipei (TW); Yu-Cheng Zhang, New Taipei (TW); Hsiu-Fu Li, New Taipei (TW); Chang-Ju Hsieh, New Taipei (TW); Tsung-Hsin Wu, New Taipei (TW); Chiung-Hsiang Wu, New Taipei (TW); Chen Chao, New Taipei (TW); Chen-Ting Kao, New Taipei (TW); Chi-Cheng Wen, New Taipei (TW); Sheng-Li Yen, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 337 days.

(21) Appl. No.: 17/949,357

(22) Filed: Sep. 21, 2022

(65) Prior Publication Data
US 2023/0113630 A1 Apr. 13, 2023

(30) Foreign Application Priority Data

Oct. 11, 2021 (CN) .......................... 202111182592.X

(51) Int. Cl.
B60L 53/80 (2019.01)
(52) U.S. Cl.
CPC .................................... B60L 53/80 (2019.02)
(58) Field of Classification Search
CPC . B60L 53/80; B60L 50/64; B60K 2001/0455; B60K 2001/0461;
(Continued)

(56) References Cited

U.S. PATENT DOCUMENTS 2,849,074 A * 8/1958 Key .................... H01M 50/202
180/68.5
3,557,895 A * 1/1971 Thomas .............. H01M 50/264
180/68.5
(Continued)

FOREIGN PATENT DOCUMENTS

CN 204452310 U * 7/2015
CN 106274760 A * 1/2017 ............. B60R 16/04
(Continued)

Primary Examiner — James A Shriver, II
Assistant Examiner — Ian Bryce Shelton
(74) Attorney, Agent, or Firm — ScienBiziP, P.C.

(57) ABSTRACT

A structure for holding a battery on an automated guided vehicle (AGV) so as to allow easy and convenient battery replacement includes two fixed supports and a bracket. The bracket is connected between the two supports and each support defines a vertical groove and two horizontal grooves. Two sliders at the ends of the bracket are insertable into either horizontal groove. The two sliders can move down along the vertical groove together until the bracket makes contact with the battery and holds it in place. The two sliders can move up along the vertical groove and sideways into the horizontal grooves, thereby unlatching and releasing the battery for rapid replacement. An AGV using the structure is also disclosed.

20 Claims, 4 Drawing Sheets

(58) Field of Classification Search
CPC .... B60K 2001/0472; B60K 2001/0488; B60K 2001/0494; B60K 1/04; B60K 2001/0466; B60K 2001/0477; B60K 2001/0483; Y02E 60/10; H01M 50/264; H01M 50/20; H01M 50/202; H01M 50/244

See application file for complete search history.

(56) References Cited

U.S. PATENT DOCUMENTS

| | | | | |
|---|---|---|---|---|
| 5,052,198 | A * | 10/1991 | Watts | B60R 16/04 180/68.5 |
| 5,377,947 | A * | 1/1995 | Johnson | H01M 50/264 180/68.5 |
| 6,102,356 | A * | 8/2000 | Huntley | H01M 50/244 248/500 |
| 7,014,002 | B2 * | 3/2006 | Mizuta | B60R 16/04 180/68.5 |
| 8,562,036 | B2 * | 10/2013 | Zhou | H01M 50/209 429/96 |
| 11,613,172 | B2 * | 3/2023 | Yun | H01M 50/20 180/68.5 |
| 2012/0146345 | A1 * | 6/2012 | Zhou | H01M 50/209 292/198 |
| 2021/0284005 | A1 * | 9/2021 | Yun | H01M 10/425 |
| 2023/0068558 | A1 * | 3/2023 | Akkur Ramabhadraiah | H01M 50/249 |
| 2023/0191939 | A1 * | 6/2023 | Zhang | H01M 50/244 180/68.5 |
| 2023/0294499 | A1 * | 9/2023 | Zhang | B60L 53/80 29/426.1 |
| 2024/0030541 | A1 * | 1/2024 | Zhang | H01M 50/249 |
| 2024/0234908 | A1 * | 7/2024 | Zhang | H01M 50/249 |

FOREIGN PATENT DOCUMENTS

| | | | | |
|---|---|---|---|---|
| CN | 106784502 | A * | 5/2017 | |
| CN | 107487169 | A * | 12/2017 | .............. B60K 1/04 |
| CN | 110001372 | A * | 7/2019 | .............. B60K 1/04 |
| CN | 110001374 | A * | 7/2019 | .............. B60K 1/04 |
| CN | 110001375 | A * | 7/2019 | .............. B60K 1/04 |
| CN | 110962561 | A * | 4/2020 | .............. B60K 1/04 |
| CN | 111347860 | A * | 6/2020 | |
| CN | 111347861 | A * | 6/2020 | .............. B60K 1/04 |
| CN | 111347917 | A * | 6/2020 | |
| CN | 111391640 | A * | 7/2020 | |
| CN | 111746255 | A * | 10/2020 | .............. B60K 1/04 |
| CN | 112223327 | A | 1/2021 | |
| CN | 213242718 | U * | 5/2021 | .............. B60L 50/66 |
| CN | 113057833 | A * | 7/2021 | |
| CN | 213689685 | U * | 7/2021 | |
| JP | 2007123179 | A * | 5/2007 | |
| KR | 20130077347 | A * | 7/2013 | |
| WO | WO-2019104871 | A1 * | 6/2019 | .............. B60K 1/04 |
| WO | WO-2022028958 | A1 * | 2/2022 | .............. B60K 1/04 |

* cited by examiner

STRUCTURE FOR HOLDING BATTERY PERMITTING RAPID REPLACEMENT AND AUTOMATED GUIDED VEHICLE USING STRUCTURE

FIELD

The subject matter herein generally relates to battery handling, and to a structure for positioning a battery and an automated guided vehicle (AGV) cart.

BACKGROUND

An automated guided vehicle (AGV) cart may carry materials and delicate objects in industrial production. However, the replacement of battery for AGV cart is difficult and inconvenient.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
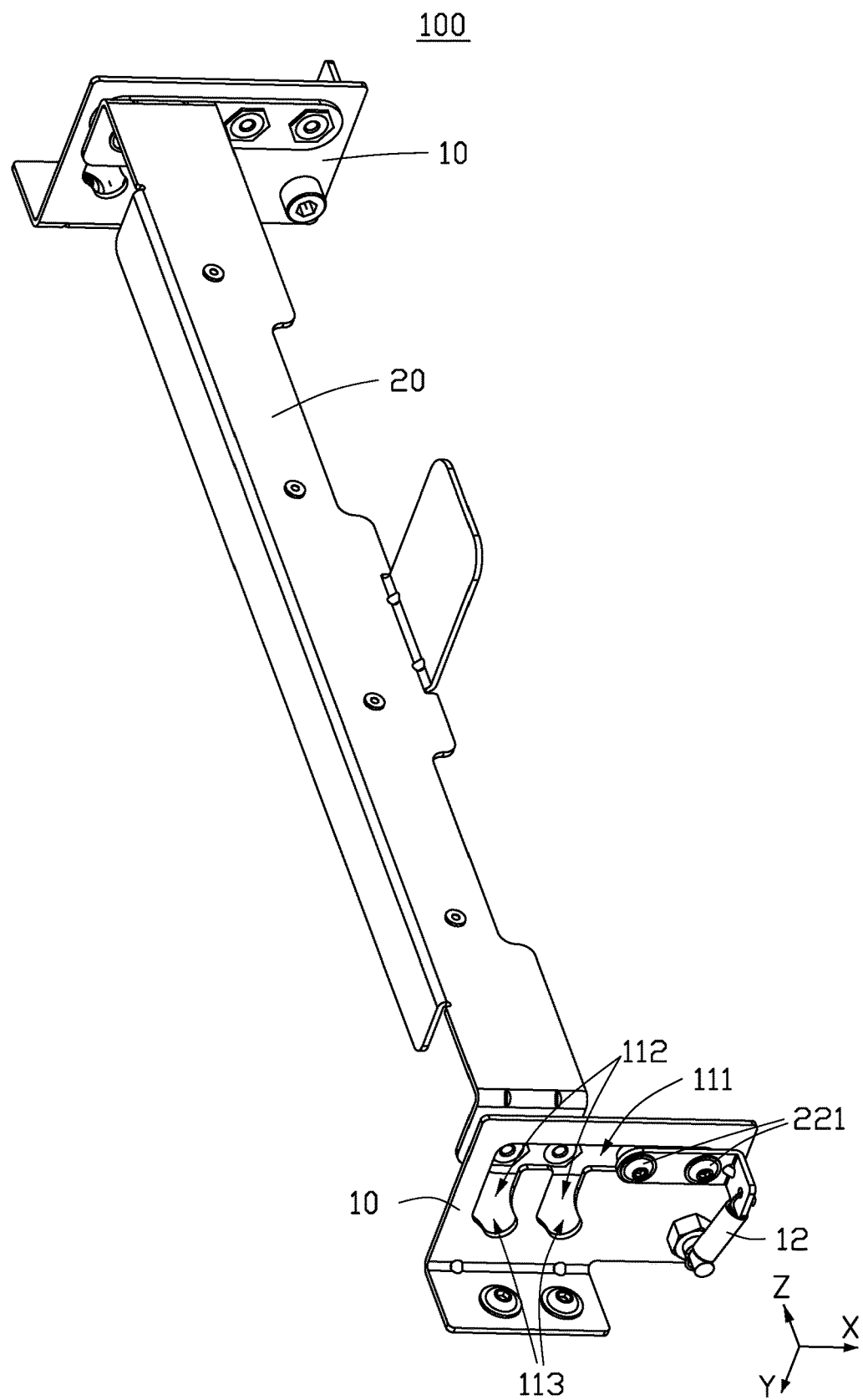
FIG. 1 is an isometric view of a battery-holding structure according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Without a given definition otherwise, all terms used have the same meaning as commonly understood by those skilled in the art. The terms used herein in the description of the present disclosure are for the purpose of describing specific embodiments only, and are not intended to limit the present disclosure.

Figure 2:
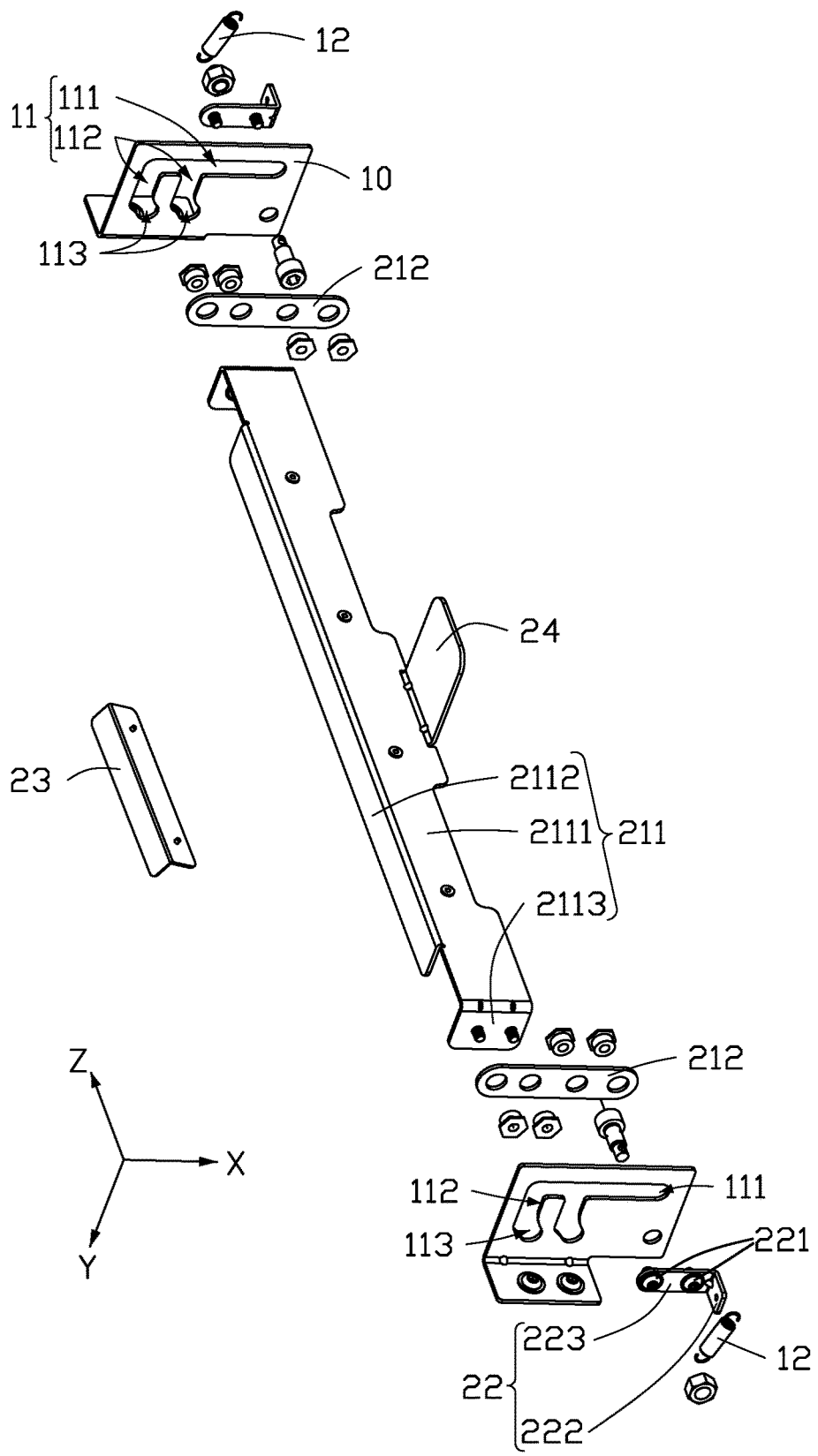
FIG. 2 is an exploded view of the structure according to an embodiment of the present disclosure.

As shown in FIG. 1 and FIG. 2, a structure for holding a battery (structure 100) of an embodiment includes two supports 10 and a bracket 20. The two supports 10 are fixed symmetrically along a plane X-Y. The bracket 20 extends along a direction Z. The bracket 20 comprises two ends along the length. The two ends each connect to a support 10. Each support 10 defines a vertical groove 111 and two horizontal grooves 112. The vertical groove 111 extends along the direction X. The horizontal grooves 112 extend along the direction Y. The two horizontal grooves 112 are connected to a side of the vertical groove 111. Each end of the bracket 20 comprises two sliders 221 and the two sliders can be inserted into the horizontal grooves 112. The two sliders 221 are movable along the horizontal grooves 112 and are able to move together into the vertical groove 111.

Figure 3:
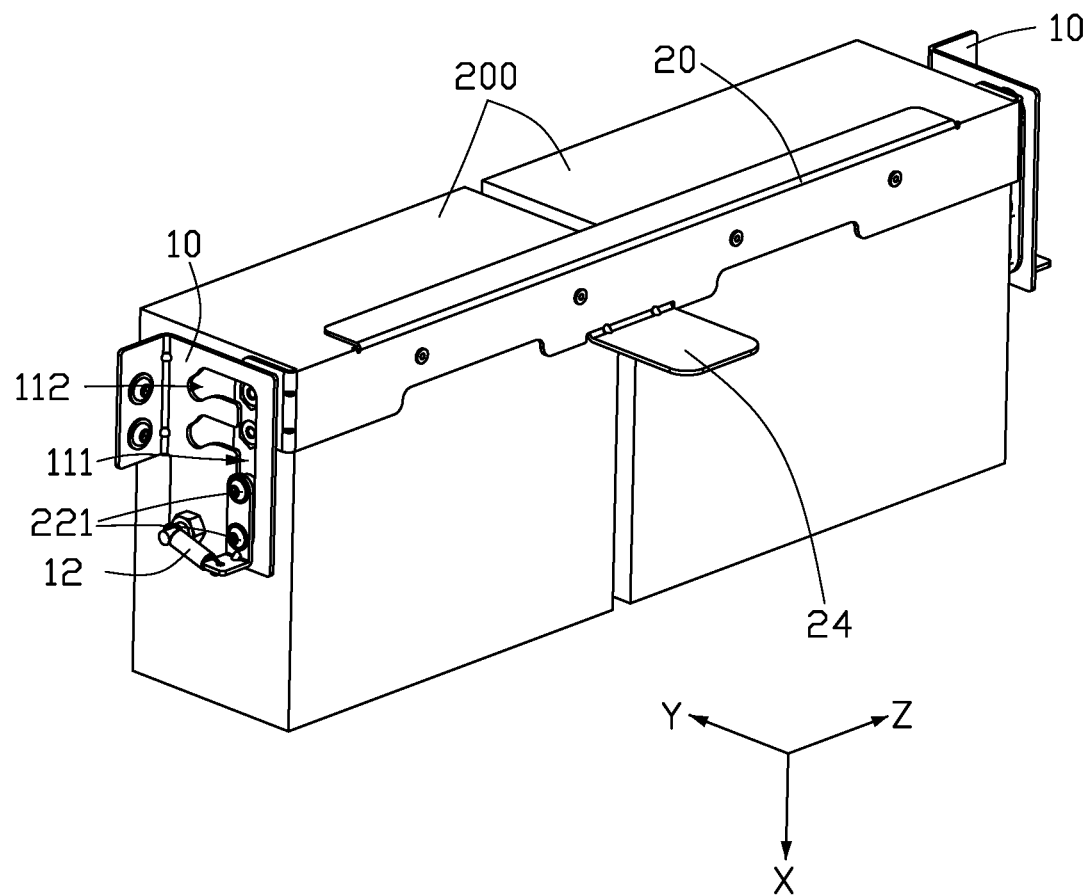
FIG. 3 is an isometric view of the structure according to an embodiment of the present disclosure.

When the two sliders 221 move together down along the vertical groove 111 until the bracket 20 contacts the battery 200 located between the two supports 10, the bracket 20 acts to position and hold the battery 200 (as shown in FIG. 3). When the two sliders 221 move up along the vertical groove 111 and move to the side into the horizontal grooves 112, the battery 200 is unlatched and can be removed for replacement (as shown in FIG. 4).

Figure 4:
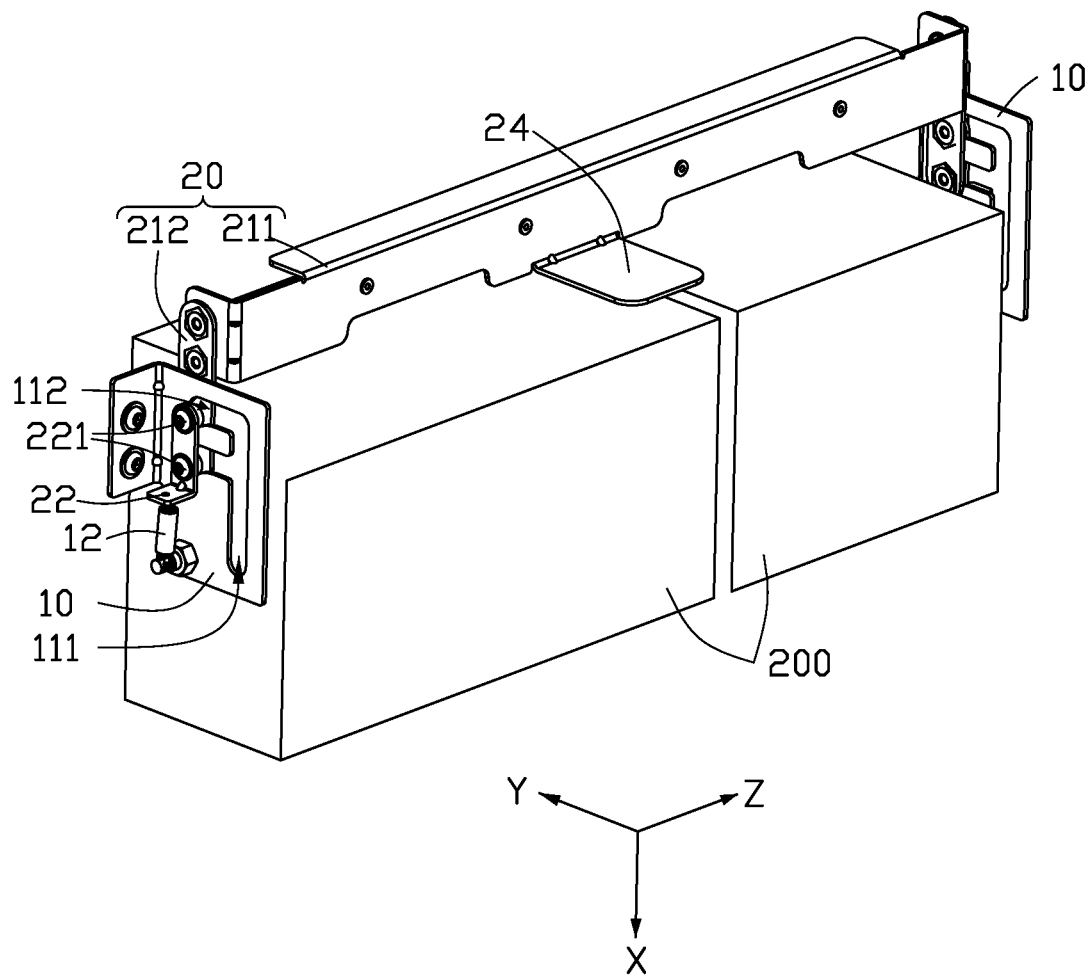
FIG. 4 is an isometric view of the structure when the structure is unlatched for replacing a battery according to an embodiment of the present disclosure.

In some embodiments, as shown in FIG. 2 and FIG. 4, the bracket 20 includes a positioning piece 211 and two extending pieces 212. The positioning piece 211 extends along the direction Z and is placed horizontally. The two extending pieces 212 extend vertically along the direction X and are located on each end of the positioning piece 211. The positioning piece 211 is connected on the top of the extending piece 212, and the two sliders 221 are located on the bottom of the extending piece 212. The extending piece 212 can raise the height of the positioning piece 211. Different lengths of extending piece 212 give different heights of the positioning piece 211, and the positioning piece 211 can be used for different sizes of battery 200.

In some embodiments, as shown in FIG. 2, the positioning piece 211 includes a first sheet 2111, a second sheet 2112, and two connecting sheets 2113. The first sheet 2111 is placed vertically. The second sheet 2112 is placed horizontally. The first sheet 2111 and the second sheet 2112 are connected and are used to position the battery 200. The two connecting sheets 2113 are connected on either end of the first sheet 2111. The connecting sheet 2113 is perpendicular to the first sheet 2111. The connecting sheet 2113 is connected to the extending piece 212 by screws.

In some embodiments, as shown in FIG. 2, the positioning piece 211 further includes an elastic gasket 23, the elastic gasket 23 is located on the first sheet 2111 or on the second sheet 2112. The elastic gasket 23 is in contact with the battery 200 and acts as a buffer or shock absorber to protect the battery 200. In some embodiments, the elastic gasket 23 is of polyformaldehyde.

In some embodiments, as shown in FIG. 2, the positioning piece 211 further includes a handle 24. The handle 24 is connected to the first sheet 2111, providing convenience in moving the bracket 20.

In some embodiments, as shown in FIG. 2, each slider 221 on the same end of the bracket 20 are connected by a connecting piece 22, providing stability in moving the two sliders 221 together.

In some embodiments, as shown in FIGS. 2, 3, and 4, each support 10 includes a spring 12. The spring 12 is connected between the support 10 and the connecting piece 22. The spring 12 pulls on the connecting piece 22 to keep the sliders 221 in the vertical groove 111 or in the horizontal groove 112, providing stability of the bracket 20 when being lifted or lowered.

In some embodiments, as shown in FIG. 2, each connecting piece includes a third sheet 223 and a fourth sheet 222. The third sheet 223 and the fourth sheet 222 are perpendicularly connected. The third sheet 223 is used to connect the two sliders 221, and the fourth sheet is used to connect the spring 12.

In some embodiments, as shown in FIG. 1 and FIG. 2, each support 10 further defines two inclined grooves 113. The two inclined grooves 113 are connected to a horizontal groove 112. The inclined grooves 113 latch with the sliders 221, providing stability of the sliders 221 when the bracket 20 is being lifted.

An automated guided vehicle of an embodiment includes the structure 100, a carriage body, and electric motor and wheels (hereinafter "car", not shown in figures). The battery 200 is placed in or on the car. The two supports 10 are fixed on the car. The structure 100 holds the battery 200 on the car.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A structure configured for holding at least one battery comprising:
    two fixed supports; and
    a bracket connected between the two fixed supports and configured to position and hold the battery between the two supports; wherein
        each of the two fixed support defines a vertical groove and two horizontal grooves, the two horizontal grooves are connected and substantially perpendicular to a side of the vertical groove, the bracket comprises two ends, each of the two ends connects to a support, each of the two ends comprises two sliders and the two sliders are insertable into the two horizontal grooves, respectively, the two sliders are movable in the horizontal grooves and are configured to move together into the vertical groove, and
        wherein when the two sliders move together down in the vertical groove until the bracket contacts the battery, the battery is latched with the bracket, and
        wherein when the two sliders move up in the vertical groove and slide into the horizontal grooves, the battery is unlatched from the bracket and removable from the structure.

2. The structure configured for holding battery of claim 1, wherein:
    the two sliders on the same end of the bracket are connected by a connecting piece.

3. The structure configured for holding battery of claim 2, wherein:
    each of the two supports comprises a spring, the spring is connected between a respective support and the connecting piece, the spring pulls on the connecting piece to maintain the sliders in the vertical groove or in the horizontal groove.

4. The structure configured for holding battery of claim 1, wherein:
    the bracket further comprises a positioning piece and two extending pieces, the positioning piece is placed horizontally, the two extending pieces are placed vertically, the two extending pieces are located on each end of the positioning piece, the positioning piece is connected to a top of the extending piece, the two sliders are located on a bottom of the extending piece, the two extending pieces are configured to lift the positioning piece.

5. The structure configured for holding battery of claim 4, wherein:
    the positioning piece comprises a first sheet, a second sheet, and two connecting sheets, the first sheet is placed vertically, the second sheet is placed horizontally, the first sheet and the second sheet are connected to position the battery, the two connecting sheets are connected on either end of the first sheet, each of the two connecting sheets is perpendicular to the first sheet, each of the two connecting sheets is connected to the extending piece.

6. The structure configured for holding battery of claim 5, wherein:
    the positioning piece further comprises an elastic gasket, the elastic gasket is located on the first sheet or on the second sheet, the elastic gasket is configured to contact with the battery elastically.

7. The structure configured for holding battery of claim 6, wherein:
    the elastic gasket is made of polyformaldehyde.

8. The structure for holding battery of claim 5, wherein:
    the positioning piece further comprises a handle, the handle is connected to the first sheet.

9. The structure configured for holding battery of claim 1, wherein:
    each of the two supports further defines two inclined grooves, each of the two inclined grooves is connected to the two horizontal grooves, respectively, the inclined grooves latch with the sliders.

10. The structure configured for holding battery of claim 3, wherein:
    the connecting piece comprises a third sheet and a fourth sheet, the third sheet and the fourth sheet are perpendicularly connected, the third sheet is connected to the two sliders, the fourth sheet is connected to the spring.

11. An automated guided vehicle comprising:
    a car;
    at least one battery located on the car; and
    a structure configured for holding battery on the car; wherein
    the structure configured for holding battery comprises:
    two fixed supports located on the car; and
    a bracket connected between the two fixed supports and configured to position and hold the battery between the two supports; wherein
        each of the two fixed support defines a vertical groove and two horizontal grooves, the two horizontal grooves are connected and substantially perpendicular to a side of the vertical groove, the bracket comprises two ends, each of the two ends connects to a support, each of the two ends comprises two sliders and the two sliders are insertable into the two horizontal grooves, respectively, the two sliders are movable in the horizontal grooves and are configured to move together into the vertical groove, and wherein when the two sliders move together down in the vertical groove until the bracket contacts the battery, the battery is latched with the bracket, and wherein when the two sliders move up in the vertical groove and slide into the horizontal grooves, the battery is unlatched from the bracket and removable from the structure.

12. The automated guided vehicle of claim 11, wherein: the two sliders on the same end of the bracket are connected by a connecting piece.

13. The automated guided vehicle of claim 12, wherein: each of the two supports comprises a spring, the spring is connected between a respective support and the connecting piece, the spring pulls on the connecting piece to maintain the sliders in the vertical groove or in the horizontal groove.

14. The automated guided vehicle of claim 11, wherein: the bracket further comprises a positioning piece and two extending pieces, the positioning piece is placed horizontally, the two extending pieces are placed vertically, the two extending pieces are located on each end of the positioning piece, the positioning piece is connected to a top of the extending piece, the two sliders are located on a bottom of the extending piece, the two extending pieces are configured to lift of the positioning piece.

15. The automated guided vehicle of claim 14, wherein: the positioning piece comprises a first sheet, a second sheet, and two connecting sheets, the first sheet is placed vertically, the second sheet is placed horizontally, the first sheet and the second sheet are connected to position the battery, the two connecting sheets are connected on either end of the first sheet, each of the two connecting sheets is perpendicular to the first sheet, each of the two connecting sheets is connected to the extending piece.

16. The automated guided vehicle of claim 15, wherein: the positioning piece further comprises an elastic gasket, the elastic gasket is located on the first sheet or the second sheet, the elastic gasket is configured to contact with the battery elastically.

17. The automated guided vehicle of claim 16, wherein: the elastic gasket is made of polyformaldehyde.

18. The automated guided vehicle of claim 15, wherein: the positioning piece further comprises a handle, the handle is connected to the first sheet.

19. The automated guided vehicle of claim 11, wherein: each of the two supports further defines two inclined grooves, each of the two inclined grooves is connected to the two horizontal grooves, respectively, the inclined grooves latch with the sliders.

20. The automated guided vehicle of claim 13, wherein: the connecting piece comprises a third sheet and a fourth sheet, the third sheet and the fourth sheet are perpendicularly connected, the third sheet is connected to the two sliders, the fourth sheet is connected to the spring.

* * * * *